(12) United States Patent
Roundy et al.

(10) Patent No.: US 9,548,988 B1
(45) Date of Patent: Jan. 17, 2017

(54) SYSTEMS AND METHODS FOR ATTRIBUTING POTENTIALLY MALICIOUS EMAIL CAMPAIGNS TO KNOWN THREAT GROUPS

(71) Applicant: Symantec Corporation, Mountain View, CA (US)

(72) Inventors: Kevin Alejandro Roundy, El Segundo, CA (US); Olivier Thonnard, Alpes-Maritimes (FR)

(73) Assignee: Symantec Corporation, Mountain View, CA (US)

( * ) Notice: Subject to any disclaimer, the term of this patent is extended or adjusted under 35 U.S.C. 154(b) by 29 days.

(21) Appl. No.: 14/461,810

(22) Filed: Aug. 18, 2014

(51) Int. Cl.
*H04L 29/06* (2006.01)

(52) U.S. Cl.
CPC .................. *H04L 63/1416* (2013.01)

(58) Field of Classification Search
USPC ...................................................... 726/22–25
See application file for complete search history.

(56) References Cited

U.S. PATENT DOCUMENTS

| | | | |
|---|---|---|---|
| 5,675,711 A | 10/1997 | Kephart et al. | |
| 2007/0079379 A1 | 4/2007 | Sprosts et al. | |
| 2008/0320095 A1 | 12/2008 | Pearson et al. | |
| 2010/0162395 A1 | 6/2010 | Kennedy | |
| 2010/0192201 A1 | 7/2010 | Shimoni et al. | |
| 2013/0086685 A1 | 4/2013 | Haynes | |
| 2013/0312097 A1 | 11/2013 | Turnbull | |
| 2014/0130157 A1 | 5/2014 | Sallam | |
| 2014/0165207 A1 | 6/2014 | Engel et al. | |
| 2014/0283035 A1 | 9/2014 | Sawhney et al. | |
| 2014/0324985 A1* | 10/2014 | Stemm | H04L 51/12 709/206 |

(Continued)

FOREIGN PATENT DOCUMENTS

WO  WO 2014/109645 A1  7/2014

OTHER PUBLICATIONS

Farkhund Iqbal, Rachid hadjidj, Benjamin C. M. Fung, Mourad Debbabi, "A novel approach of mining write-prints for authorship attribution in e-mail forensics", Digital Investigation 5 (2008), 1742-2876/$, pp. S42-S51.*

(Continued)

*Primary Examiner* — Edward Zee
*Assistant Examiner* — Chi Nguy
(74) *Attorney, Agent, or Firm* — Fisherbroyles LLC

(57) ABSTRACT

The disclosed computer-implemented method for attributing potentially malicious email campaigns to known threat groups may include (1) identifying a potentially malicious email campaign targeting at least one organization, (2) detecting, within the potentially malicious email campaign, an incriminating feature that has been linked to a known threat group, (3) determining, based at least in part on detecting the incriminating feature linked to the known threat group, that the known threat group is likely responsible for the potentially malicious email campaign, and then in response to determining that the known threat group is likely responsible for the potentially malicious email campaign, (4) attributing the potentially malicious email campaign to the known threat group. Various other methods, systems, and computer-readable media are also disclosed.

20 Claims, 7 Drawing Sheets

(56) References Cited

U.S. PATENT DOCUMENTS

2015/0007312 A1* 1/2015 Pidathala .............. H04L 63/145
726/22

OTHER PUBLICATIONS

Mamoun Alazab, Robert Layton, Roderic Broadhursst, Brigitte Bouhours, "Malicious Spam Emails Developments and Authorship Attribution", 2013 Fourth Cybercrime and Trustworthy Computing Workshop, IEE 978-1-4799-3075-3/14, pp. 58-68.*
Chun Wei, "Clustering Spam Domains and Host: Anti-Spam Forensics with Data Mining", (2010) The University of Alabama at Birmingham, pp. 1-132.*
Kevin Roundy, et al; Systems and Methods for Anomaly-Based Detection of Compromised IT Administration Accounts; U.S. Appl. No. 14/205,335, filed Mar. 11, 2014.
Kevin Alejandro Roundy, et al; Systems and Methods for Classifying Security Events as Targeted Attacks; U.S. Appl. No. 14/513,804, filed Oct. 14, 2014.
Yun Shen, et al; Systems and Methods for Identifying Security Threat Sources Responsible for Security Events; U.S. Appl. No. 14/519,565, filed Oct. 21, 2014.
"Industrial Espionage and Targeted Attacks: Understanding the Characteristics of an Escalating Threat", http://link.springer.com/chapter/10.1007%2F978-3-642-33338-5_4, as accessed on Jul. 31, 2014, (Sep. 12-14, 2012).
McWhorter, Dan "Mandiant Exposes APT1—One of China's Cyber Espionage Units & Releases 3,000 Indicators", https://www.mandiant.com/blog/mandiant-exposes-apt1-chinas-cyber-espionage-units-releases-3000-indicators/, as accessed on Jul. 31, 2014, (Feb. 18, 2013).
"Wombat Security Technologies", https://www.wombatsecurity.com/, as accessed Aug. 19, 2014, (Aug. 17, 2008).
Hu, Xin et al., "MutantX-S: Scalable Malware Clustering Based on Static Features", http://web.eecs.umich.edu/~huxin/papers/xin_MutantX.pdf, as accessed Aug. 19, 2014, 2013 USENIX Annual Technical Conference, (2013), pp. 187-198.
"FireEye", https://www.fireeye.com/, as accessed Aug. 19, 2014, (Oct. 12, 1999).
"Dell SecureWorks", http://www.secureworks.com/, as accessed Aug. 19, 2014, (Jan. 11, 1998).
"Mandiant", https://www.mandiant.com/, as accessed Aug. 19, 2014, (Feb. 4, 2006).
"Security Information & Event Management—SIEM", http://www8.hp.com/us/en/software-solutions/siem-security-information-event-management/, as accessed Aug. 19, 2014, Hewlett-Packard Development Company, L.P., (on or before Aug. 19, 2014).
"Cloud & Smarter Infrastructure", http://www.ibm.com/software/tivoli, as accessed Aug. 19, 2014, IBM, (Mar. 26, 2002).
"Business Assurance Technology", https://www.bluecoat.com/products/business-assurance-technology, as accessed Aug. 19, 2014, Blue Coat Systems, Inc., (on or before Aug. 19, 2014).
"Splunk®", http://www.splunk.com/en_us/solutions/solution-areas/security-and-fraud.html, as accessed Aug. 19, 2014, (on or before Aug. 19, 2014).
"LogRhythm", http://ecrm.logrhythm.com/P-Gartner2014MagicQuadrantSIEMReportLogRhythm-RT.html?utm_medium=cpc&utm_campaign=LogRhythmBrandTerms&AdGroup=LogRhythm&gclid=CjwKEAjw-o6hBRDOmsPSjqakuzYSJADR2V3SBBhEFHOQqwhx6DmQct0SnNlwIANXqwhSq0YJ6BT-6BoCI0Hw_wcB, as accessed Aug. 19, 2014, (on or before Aug. 19, 2014).
"RSA enVision", http://www.emc.com/support/rsa/eops/siem.htm, as accessed Aug. 19, 2014, EMC Corporation, (Apr. 7, 2012).
"Cisco Security Manager", http://www.cisco.com/c/en/us/products/security/security-manager/index.html, as accessed Aug. 19, 2014, (Aug. 12, 2014).
"Emerald Security Group", http://www.esgroupusa.com/, as accessed Aug. 19, 2014, (Feb. 7, 2012).
Zhao, Yao et al., "BotGraph: Large Scale Spamming Botnet Detection", Proceedings of the 6th USENIX Symposium on Networked Systems Design and Implementation, NSDI'09, USENIX Association, Berkeley, CA, (2009), pp. 321-334.
Zhuang, Li et al., "Characterizing Botnets from Email Spam Records", Proceedings of the 1st Usenix Workshop on Large-Scale Exploits and Emergent Threats, LEET'08, USENIX Association, Berkeley, CA, (2008), pp. 2:1-2:9.
Singh, Kamaldeep et al., "Big Data Analytics framework for Peer-to-Peer Botnet detection using Random Forests", Information Sciences, vol. 278, (Mar. 29, 2014), pp. 488-497.
Zhang, Qunyan et al., "Duplicate Detection for Identifying Social Spam in Microblogs", 2013 IEEE International Congress on Big Data (BigData Congress), (Jun. 2013), pp. 141-148.
Caruana, Godwin et al., "An ontology enhanced parallel SVM for scalable spam filter training", Neurocomputing, vol. No. 108, (May 2013), pp. 45-57.
Debar, Hervé et al., "Aggregation and Correlation of Intrusion-Detection Alerts", RAID 2001, LNCS 2212, (2001), pp. 85-103.
Techniques for Detecting Malicious Code; U.S. Appl. No. 14/035,519, filed Sep. 24, 2013.
Skormin, Victor et al., "Customized Normalcy Profiles for the Detection of Targeted Attacks", EvoApplications 2012, LNCS 7248, (Apr. 11, 2012), pp. 487-496.
Thonnard, Olivier et al., "Industrial Espionage and Targeted Attacks: Understanding the Characteristics of an Escalating Threat", Research in Attacks, Intrusions, and Defenses; Lecture Notes in Computer Science, vol. 7462, (Sep. 12-14, 2012), pp. 64-85.

* cited by examiner

SYSTEMS AND METHODS FOR ATTRIBUTING POTENTIALLY MALICIOUS EMAIL CAMPAIGNS TO KNOWN THREAT GROUPS

BACKGROUND

Computer security systems are often used to detect email attacks on computing devices. For example, a computing device may include a computer security system. In this example, the computer security system may detect a malicious email accessed by the computing device via the Internet.

Unfortunately, some conventional computer security systems may be unable to determine whether a particular email attack is an isolated incident or part of a targeted email campaign. For example, certain organizations (such as corporations and/or government entities) may have computing devices that include conventional computer security systems. In this example, the conventional computer security systems may be unable to determine whether malicious emails accessed by the computing devices are part of a comprehensive malicious email campaign targeting these organizations.

Even in the event that certain conventional computer security systems are able to determine that a particular email attack is part of a targeted email campaign, these security systems may be unable to accurately attribute the targeted email campaign to a known threat group. In other words, these security systems may be unable to determine which threat group is responsible for the targeted email campaign. As a result, these security systems may be unable to warn the organizations about the targeted email campaign and/or the responsible threat group in time to deploy any effective countermeasures.

The instant disclosure, therefore, identifies and addresses a need for systems and methods for attributing potentially malicious email campaigns and their corresponding malicious executables to known threat groups.

SUMMARY

As will be described in greater detail below, the instant disclosure describes various systems and methods for attributing potentially malicious email campaigns to known threat groups by detecting incriminating features within the potentially malicious email campaigns.

In one example, a computer-implemented method for attributing potentially malicious email campaigns to known threat groups may include (1) identifying a potentially malicious email campaign targeting at least one organization, (2) detecting, within the potentially malicious email campaign, an incriminating feature that has been linked to a known threat group, (3) determining, based at least in part on detecting the incriminating feature linked to the known threat group, that the known threat group is likely responsible for the potentially malicious email campaign, and then in response to determining that the known threat group is likely responsible for the potentially malicious email campaign, (4) attributing the potentially malicious email campaign to the known threat group. In addition, the method may include notifying the targeted organization that the known threat group is likely responsible for the potentially malicious email campaign.

In one example, the method may also include identifying a data cluster that specifies a plurality of features linked to the known threat group. In this example, the method may further include identifying the incriminating feature within the data cluster.

In one example, the method may also include identifying an open-source intelligence resource prior to identifying the incriminating feature within the data cluster. This open-source intelligence resource may indicate that the incriminating feature is allegedly connected to the known threat group. In this example, the method may further include linking the incriminating feature to the known threat group based at least in part on the open-source intelligence resource by adding the incriminating feature to the data cluster.

In one example, the method may also include identifying a plurality of emails addressed to the targeted organization and then detecting a potentially malicious resource (such as a malicious attachment and/or a Uniform Resource Locator (URL) to a malicious website) within at least one of the plurality of emails. In this example, the method may further include determining that the potentially malicious resource has been linked to the known threat group.

In one example, the method may also include identifying at least one static characteristic of the potentially malicious resource. In this example, the method may further include determining that the static characteristic of the potentially malicious resource matches the incriminating feature linked to the known threat group.

In one example, the method may also include identifying at least one dynamic characteristic of the potentially malicious resource. For example, the method may include executing at least a portion of the potentially malicious resource and then observing the dynamic characteristic of the potentially malicious resource during execution. In this example, the method may further include determining that the dynamic characteristic of the potentially malicious resource matches the incriminating feature linked to the known threat group.

As a specific example, the dynamic characteristic of the potentially malicious resource may include a Command and Control (C&C) domain contacted by the potentially malicious resource during execution. In this example, the incriminating feature linked to the known threat group may include a C&C domain used by the known threat group.

As another example, a system for implementing the above-described method may include (1) an identification module that (A) identifies a potentially malicious email campaign targeting at least one organization and (B) detects, within the potentially malicious email campaign, an incriminating feature that has been linked to a known threat group, (2) a determination module that determines, based at least in part on the detection of the incriminating feature linked to the known threat group, that the known threat group is likely responsible for the potentially malicious email campaign, (3) an attribution module that attributes the potentially malicious email campaign to the known threat group in response to the determination that the known threat group is likely responsible for the potentially malicious email campaign, and (4) at least one physical processor that executes the identification module, the determination module, and the attribution module.

As an additional example, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a potentially malicious email campaign targeting at least one organization, (2) detect, within the potentially malicious email campaign, an incriminating feature that has been linked to a known threat group, (3) determine, based at least in part on the detection of the incriminating feature linked to the known threat group, that the known threat group is likely responsible for the potentially malicious email campaign, and then in response to the determination that the known threat group is likely responsible for the potentially malicious email campaign, (4) attribute the potentially malicious email campaign to the known threat group.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
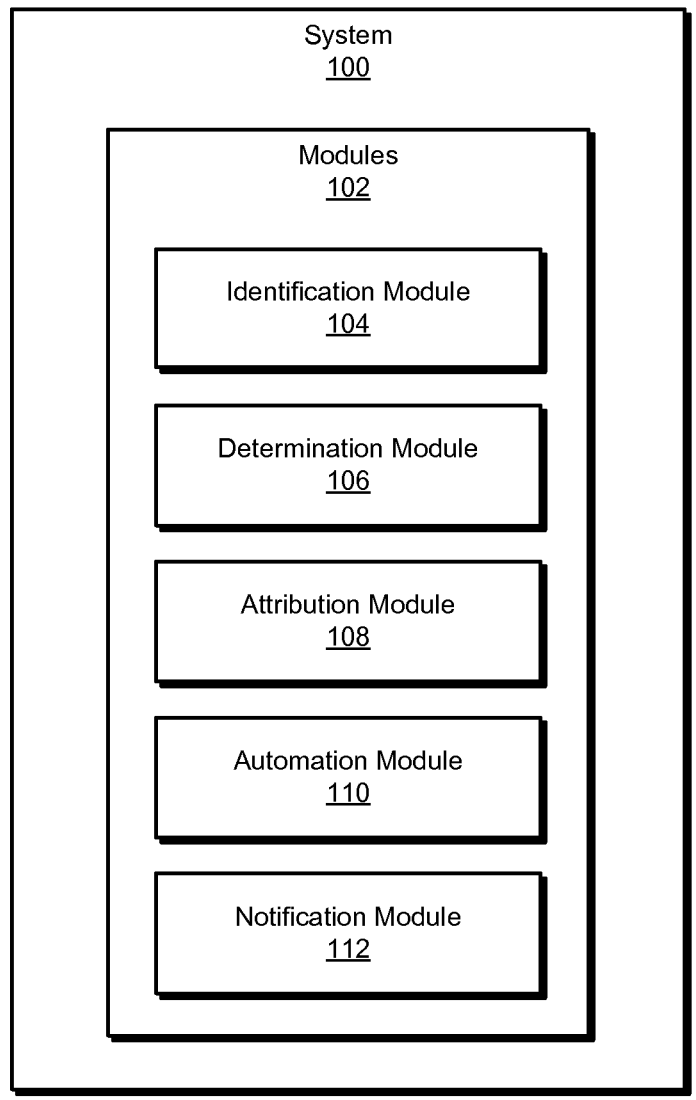
FIG. 1 is a block diagram of an exemplary system for attributing potentially malicious email campaigns to known threat groups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for attributing potentially malicious email campaigns to known threat groups. As will be explained in greater detail below, by creating data clusters that specify certain features that have been linked to known threat groups, the various systems and methods described herein may be able to match certain features detected in connection with potentially malicious email campaigns against the data clusters. Additionally or alternatively, by matching such features against the data clusters in this way, the various systems and methods described herein may be able to determine which threat groups are responsible for the potentially malicious email campaigns and/or attribute such campaigns to the responsible threat groups.

These systems and methods may then notify the organizations targeted by the potentially malicious email campaigns as to which threat groups are responsible for such campaigns. By notifying the targeted organizations in this way, these systems and methods may be able to warn the targeted organizations about the potentially malicious email campaigns and/or the responsible threat groups in time to deploy effective countermeasures.

Figure 2:
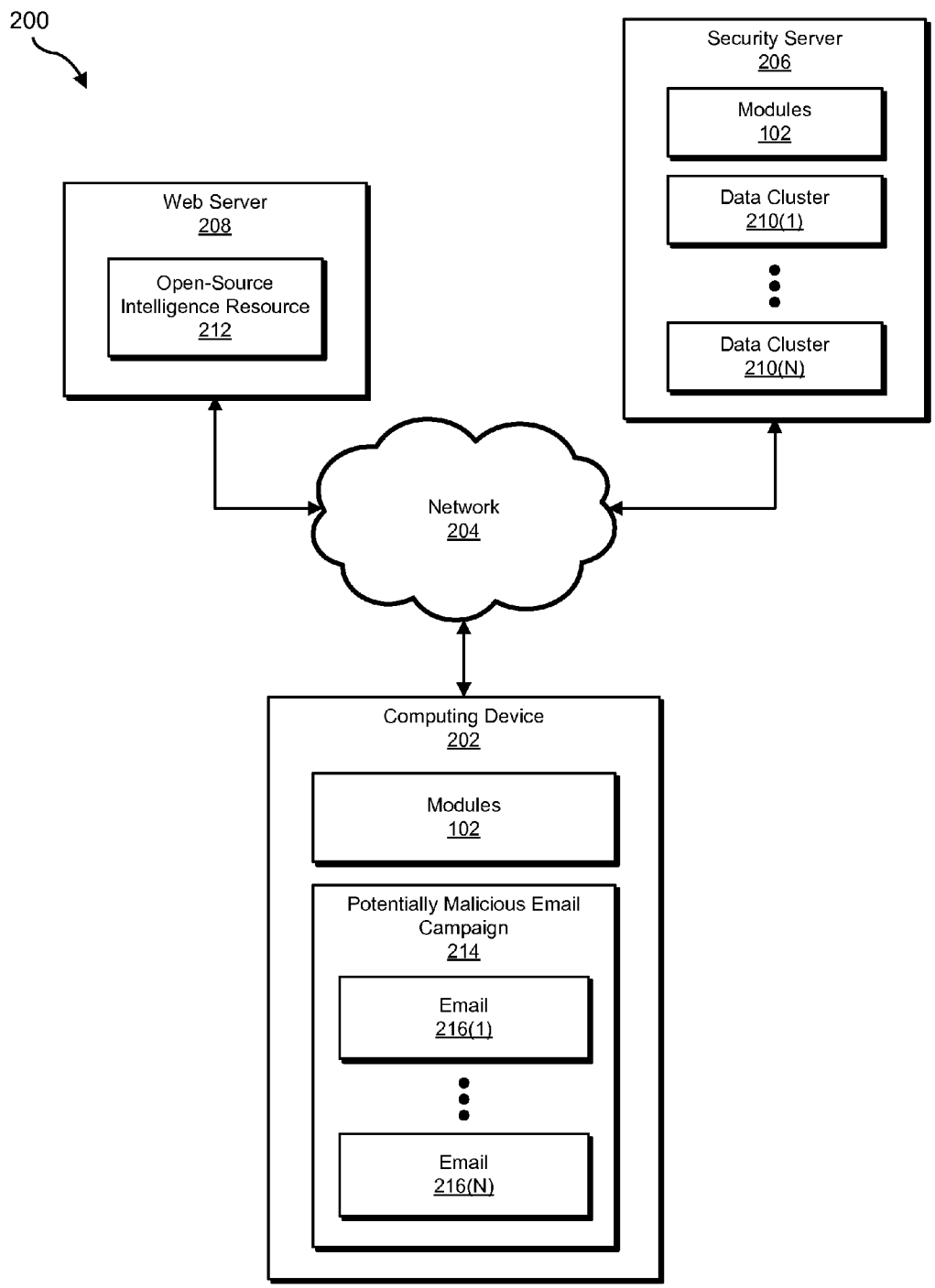
FIG. 2 is a block diagram of an additional exemplary system for attributing potentially malicious email campaigns to known threat groups.

The following will provide, with reference to FIGS. 1-2, detailed descriptions of exemplary systems for attributing potentially malicious email campaigns to known threat groups. Detailed descriptions of corresponding computer-implemented methods will be provided in connection with FIG. 3. Detailed descriptions of exemplary email metadata will be provided in connection with FIG. 4. Detailed descriptions of an exemplary data cluster that specifies a plurality of features linked to a known threat group will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for attributing potentially malicious email campaigns to known threat groups. As illustrated in this figure, exemplary system 100 may include one or more modules 102 for performing one or more tasks. For example, and as will be explained in greater detail below, exemplary system 100 may include an identification module 104 that (1) identifies a potentially malicious email campaign targeting at least one organization and (2) detects, within the potentially malicious email campaign, an incriminating feature that has been linked to a known threat group. Exemplary system 100 may also include a determination module 106 that determines, based at least in part on the detection of the incriminating feature linked to the known threat group, that the known threat group is likely responsible for the potentially malicious email campaign.

In addition, and as will be described in greater detail below, exemplary system 100 may include an attribution module 108 that attributes the potentially malicious email campaign to the known threat group in response to the determination that the known threat group is likely responsible for the potentially malicious email campaign. Exemplary system 100 may further include an automation module 110 that that executes at least a portion of a potentially malicious resource detected in connection with the potentially malicious email campaign. Finally, exemplary system 100 may include a notification module 112 that notifies the organization that the known threat group is likely responsible for the potentially malicious email campaign. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, security server 206, and/or web server 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a security server 206 and/or a web server 208 via a network 204. In one example, computing device 202 may be programmed with one or more of modules 102. Additionally or alternatively, computing device 202 may include, receive, access, and/or be subjected to a potentially malicious email campaign 214.

The term "potentially malicious email campaign," as used herein, generally refers to any type or form of email-based and/or social engineering attack targeting one or more organizations. In one example, potentially malicious email campaign 214 may include and/or represent a plurality of emails 216(1)-(N) (such as spear phishing emails) targeting an organization that owns and/or uses computing device 202. In other words, a member and/or employee of the targeted organization may receive and/or access at least a portion of potentially malicious email campaign 214 via computing device 202. Examples of potentially malicious email campaign 214 include, without limitation, the "Nitro" attack campaign, the "Rise of Taidoor" campaign, variations of one or more of the same, or any other potentially malicious email campaign.

In one example, potentially malicious email campaign 214 may target a single organization. In another example, potentially malicious email campaign 214 may target a plurality of organizations. Additionally or alternatively, portions of potentially malicious email campaign 214 may have been reused and/or recycled from one or more previous potentially malicious email campaigns perpetrated by the same threat group.

In one example, security server 206 may be programmed with one or more of modules 102. Additionally or alternatively, security server 206 may include, create, maintain, and/or update data clusters 210(1)-(N). The term "data cluster," as used herein, generally refers to any type or form of data set clustered and/or grouped together by certain commonalities, techniques, and/or features. For example, data cluster 210(1) may include and/or represent a data set that identifies certain techniques and/or features that have been linked to and/or used by a specific threat group. In this example, data cluster 210(N) may include and/or represent another data set that identifies certain techniques and/or features that have been linked to and/or used by another threat group.

As shown in FIG. 2, web server 208 may include, store, and/or host an open-source intelligence resource 212. The term "open-source intelligence resource," as used herein, generally refers to any type or form of publicly available and/or accessible source of information, data, and/or intelligence. Examples of open-source intelligence resource 212 include, without limitation, WHOIS databases, Internet Protocol (IP) address databases and/or blacklists, Domain Name System (DNS) databases and/or blacklists, security blogs, hacker forums, underground forums, variations of one or more of the same, combinations of one or more of the same, or any other suitable open-source intelligence resource.

In one embodiment, one or more of modules 102 from FIG. 1 may, when executed by at least one processor of computing device 202 and/or security server 206, enable computing device 202 and/or security server 206 to attribute potentially malicious email campaigns to known threat groups. For example, and as will be described in greater detail below, one or more of modules 102 may cause computing device 202 and/or security server 206 to (1) identify potentially malicious email campaign 214, (2) detect, within potentially malicious email campaign 214, an incriminating feature that has been linked to a known threat group, (3) determine, based at least in part on detecting the incriminating feature linked to the known threat group, that the known threat group is likely responsible for potentially malicious email campaign 214, and then in response to determining that the known threat group is likely responsible for the potentially malicious email campaign, (4) attributing potentially malicious email campaign 214 to the known threat group.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In one example, computing device 202 may belong to an organization targeted by potentially malicious email campaign 214. Although illustrated as a single device, computing device 202 may represent a plurality of computing devices that used by the targeted organization.

Security server 206 generally represents any type or form of computing device capable of attributing potentially malicious email campaigns to known threat groups. Examples of security server 206 include, without limitation, security servers, application servers, web servers, storage servers, and/or database servers configured to run certain software applications and/or provide various security, web, storage, and/or database services. In one example, security server 206 may belong to a security service provider responsible for protecting the targeted organization against cyberattacks. Although illustrated as a single device, security server 206 may represent a plurality of security servers working in conjunction with one another to protect the targeted organization against cyberattacks.

Web server 208 generally represents any type or form of computing device capable of storing, hosting, and/or distributing open-source intelligence resources. Examples of web server 208 include, without limitation, web servers, application servers, security servers, storage servers, and/or database servers configured to run certain software applications and/or provide various web, security, storage, and/or database services. Although illustrated as a single device, web server 208 may represent a plurality of web servers that store, host, and/or distribute open-source intelligence resources.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 700 in FIG. 7, or the like. Network 204 may facilitate communication or data transfer using wireless or wired connections. In one example, network 204 may facilitate communication between computing devices 202(1)-(N) and security server 206.

Figure 3:
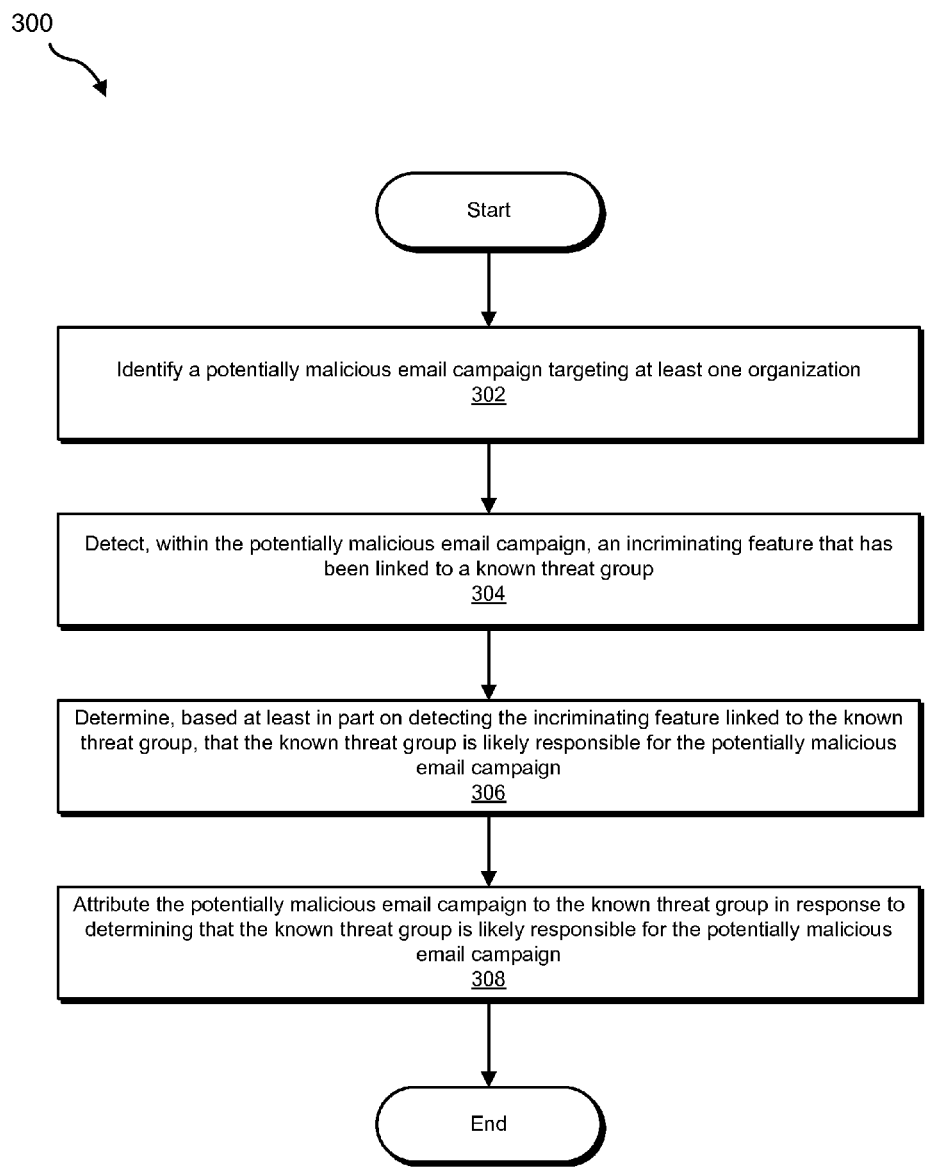
FIG. 3 is a flow diagram of an exemplary method for attributing potentially malicious email campaigns to known threat groups.

FIG. 3 is a flow diagram of an exemplary computer-implemented method 300 for attributing potentially malicious email campaigns to known threat groups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a potentially malicious email campaign targeting at least one organization. For example, identification module 104 may, as part of computing device 202 and/or security server 206 in FIG. 2, identify potentially malicious email campaign 214 targeting at least one organization. In this example, potentially malicious email campaign 214 may include a plurality of emails 216(1)-(N) addressed to the targeted organization. Examples of targeted organizations include, without limitation, corporations, government entities, military entities, businesses, security customer bases, schools, colleges, universities, institutions, associations, groups, collectives, think tanks, variations of one or more of the same, combinations of one or more of the same, or any other suitable organizations.

The systems described herein may perform step 302 in a variety of ways and/or contexts. In some examples, identification module 104 may identify potentially malicious email campaign 214 based at least in a part on certain commonalities, techniques, and/or features of the plurality of emails 216(1)-(N). For example, identification module 104 may identify at least one member and/or employee of the targeted organization as the addressee and/or recipient of the plurality of emails 216(1)-(N). In this example, each of emails 216(1)-(N) may represent an attempt to penetrate, infiltrate, and/or infect the targeted organization. Additionally or alternatively, the plurality of emails 216(1)-(N) may represent a collective attempt to penetrate, infiltrate, and/or infect the targeted organization.

In one example, identification module 104 may identify certain features shared by the plurality of emails 216(1)-(N). The term "feature," as used herein, generally refers to any type or form of resource, metadata, technique, attribute, characteristic, and/or element of an email or a potentially malicious email campaign. As will be described in greater detail below, certain features may be linked to known threat groups. In other words, some threat groups may be known to send emails that have certain features.

Examples of features shared by the plurality of emails 216(1)-(N) include, without limitation, common attachments, common characteristics of attachments, common hashes, common subject lines, common portions of email bodies, common filenames, common originating IP addresses, common countries of origin, common Internet Service Providers (ISPs), common originating email addresses, common originating email providers, common email agents used to send the plurality of emails 216(1)-(N), common transmission dates and/or times, common C&C domains used in connection with the plurality of emails 216(1)-(N), common languages used in the plurality of emails 216(1)-(N), common character sets used to encode the plurality of emails 216(1)-(N), common antivirus signatures for attachments, common attachment file types, variations of one or more of the same, combinations of one or more of the same, or any other suitable features shared by the plurality of emails 216(1)-(N).

In one example, identification module 104 may identify potentially malicious email campaign 214 by applying certain Multi-Criteria Decision Analysis (MCDA) techniques to emails addressed to the organization. The term "Multi-Criteria Decision Analysis" and the abbreviation "MCDA," as used herein, generally refer to any type or form of algorithm and/or analysis that clusters and/or groups emails and/or security events into data sets based at least in part on common techniques and/or features. Accordingly, MCDA techniques may enable identification module 104 to identify complex patterns and/or relationships among certain emails addressed to the organization. For example, identification module 104 may apply MCDA techniques to various emails received by certain members and/or employees of the organization. By applying the MCDA techniques to these emails, identification module 104 may be able to identify the plurality of emails 216(1)-(N) as a comprehensive potentially malicious email campaign.

Returning to FIG. 3, at step 304 one or more of the systems described herein may detect, within the potentially malicious email campaign, an incriminating feature that has been linked to a known threat group. For example, identification module 104 may, as part of computing device 202 and/or security server 206 in FIG. 2, detect an incriminating feature within potentially malicious email campaign 214. In this example, the incriminating feature may have been linked to a known threat group.

The term "incriminating feature," as used herein, generally refers to any type or form of feature that incriminates and/or implicates a specific threat group. Examples of incriminating features include, without limitation, malware samples authored by known threat groups, hashes of malware samples authored by known threat groups, code sequences pertaining to malware samples authored by known threat groups, filenames of malware samples authored by known threat groups, IP addresses used by known threat groups, countries of origin of known threat groups, ISPs of known threat groups, email addresses used by known threat groups, email providers used by known threat groups, email agents used by known threat groups, attack dates and/or times linked to known threat groups, subject lines or bodies of emails sent by known threat groups, C&C domains used by known threat groups, languages used by known threat groups, character sets used to encode emails sent by known threat groups, antivirus signatures of attachments included in emails sent by known threat groups, file types of attachments included in emails sent by known threat groups, variations of one or more of the same, combinations of one or more of the same, or any other suitable features that incriminate and/or implicate a specific threat group.

The phrase "linked to," as used herein, generally refers to any type or form of relationship, connection, and/or association between a feature and a known threat group. The term "threat group," as used herein, generally refers to any type or form of designation, organization, and/or group that includes one or more members known to perpetrate cyber-attacks. Examples of known threat groups include, without limitation, Anonymous, Covert Grove, CyberVor, Honker Union, RedHack, TeaMp0isoN, TeslaTeam, UGNazi, variations of one or more of the same, or any other known threat groups.

Figure 4:
FIG. 4 is an illustration of exemplary email metadata collected in connection with a potentially malicious email campaign.

The systems described herein may perform step 304 in a variety of ways and/or contexts. In some examples, identification module 104 may detect the incriminating feature by analyzing potentially malicious email campaign 214 in view of data clusters 210(1)-(N). In one example, identification module 104 may identify one or more features of potentially malicious email campaign 214. For example, identification module 104 may identify one or more features of email 216(1) included in potentially malicious email campaign 214 based at least in part on email metadata 400 in FIG. 4. As shown in FIG. 4, email metadata 400 may identify a corresponding email (in this example, "Email 216(1)"), any attachment filenames (in this example, "SuspiciousFile.PDF"), the sender's IP address (in this example, "65.130.239.253"), the email's country of origin (in this example, "Russia"), the sender's email address (in this example, "JohnDoe@Email.com"), and/or the recipient's email address (in this example, "JoeEmployee@BigCorporation.com").

Figure 5:
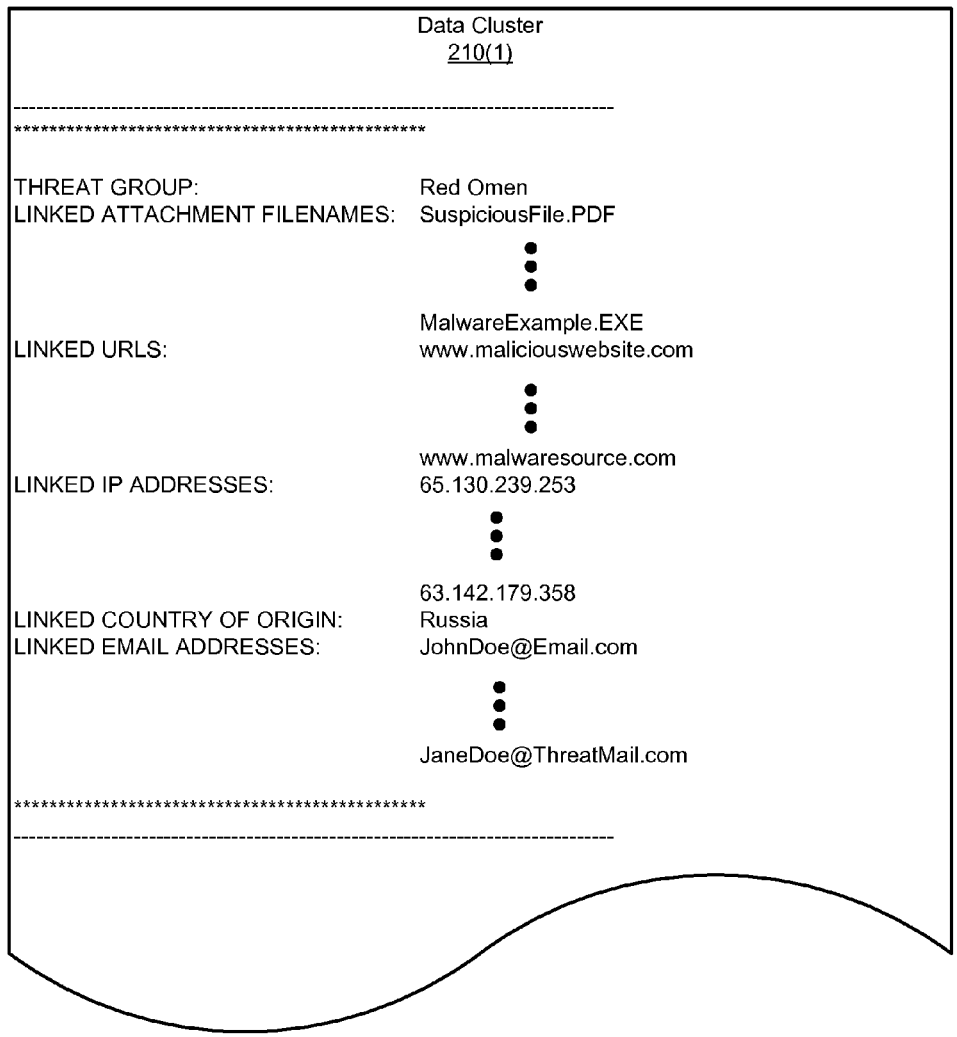
FIG. 5 is an illustration of an exemplary data cluster that specifies a plurality of features linked to a known threat group.

In one example, identification module 104 may identify one or more of data clusters 210(1)-(N) maintained on server 206. For example, identification module 104 may identify data cluster 210(1) in FIG. 5 that specifies a plurality of features linked to a known threat group. As shown in FIG. 5, data cluster 210(1) may specify a known threat group (in this example, "Red Omen"), attachment filenames linked to the known threat group (in this example, "SuspiciousFile.PDF," "MalwareExample.EXE," and so on), URLs linked to the known threat group (in this example, "www.maliciouswebsite.com," "www.malwaresource.com," and so on), IP addresses linked to the known threat group (in this example, "65.130.239.253," "63.142.179.358," and so on), a country of origin linked to the known threat group (in this example, "Russia"), and/or email addresses linked to the known threat group (in this example, "JohnDoe@Email.com," "JaneDoe@ThreatMail.com," and so on).

Upon identifying the features of potentially malicious email campaign 214, identification module 104 may compare those features with data clusters 210(1)-(N). For example, identification module 104 may compare email metadata 400 in FIG. 4 with data cluster 210(1) in FIG. 5. In this example, determination module 106 may determine that both email metadata 400 and data cluster 210(1) identify the "SuspiciousFile.PDF" attachment, the "65.130.239.253" IP address, "Russia" as the country of origin, and/or the "JohnDoe@Email.com" address.

Any one of these commonalities may represent an incriminating feature. In one example, identification module 104 may detect a potentially malicious resource within potentially malicious email campaign 214. For example, identification module 104 may detect the "SuspiciousFile.PDF" attachment within email 216(1) included in potentially malicious email campaign 214. In this example, determination module 106 may determine that the "SuspiciousFile.PDF" attachment has been linked to the "Red Omen" threat group by comparing the "SuspiciousFile.PDF" attachment with data cluster 210(1). Examples of potentially malicious resources include, without limitation, malicious attachments, URLs to malicious websites, variations of one or more of the same, combinations of one or more of the same, or any other potentially malicious resources.

Additionally or alternatively, any combination of these commonalities may represent an incriminating feature. For example, identification module 104 may detect the "SuspiciousFile.PDF" attachment, the "65.130.239.253" IP address, "Russia" as the country of origin, and the "JohnDoe@Email.com" address within email 216(1) included in potentially malicious email campaign 214. In this example, determination module 106 may determine that these 4 commonalities exceed a threshold number of commonalities (e.g., at least 3 commonalities). As a result, determination module 106 may determine that this combination of commonalities represents an incriminating feature linked to the "Red Omen" threat group.

In some examples, determination module 106 may determine that the potentially malicious resource has been linked to the known threat group based at least in part on at least one static characteristic of the potentially malicious resource. For example, identification module 104 may identify at least one static characteristic of the "SuspiciousFile.PDF" attachment. Determination module 106 may then determine that the static characteristic of the "SuspiciousFile.PDF" attachment matches an incriminating feature linked to the "Red Omen" threat group.

The term "static characteristic," as used herein in connection with a potentially malicious resource, generally refers to any type or form of attribute and/or characteristic that is identifiable without necessarily executing the potentially malicious resource. Examples of static characteristics of potentially malicious resources include, without limitation, hashes of malware samples, filenames of malware samples, IP addresses used by authors of malware samples, countries of origin of malware samples, ISPs of authors of malware samples, email addresses used by authors of malware samples, email providers used by authors of malware samples, email agents used by authors of malware samples, release dates and/or times of malware samples, subject lines or bodies of emails by authors of malware samples, languages used by authors of malware samples, character sets used to encode emails sent by authors of malware samples, antivirus signatures of malware samples, file types of attachments that include malware samples, variations of one or more of the same, combinations of one or more of the same, or any other static characteristics of potentially malicious resources.

Additionally or alternatively, determination module 106 may determine that the potentially malicious resource has been linked to the known threat group based at least in part on at least one dynamic characteristic of the potentially malicious resource. In one example, identification module 104 may identify at least one dynamic characteristic of the "SuspiciousFile.PDF" attachment. For example, automation module 110 may, as part of computing device 202 and/or security server 206 in FIG. 2, open and/or execute the "SuspiciousFile.PDF" attachment, thereby potentially causing a remote download of malicious code from a C&C domain. Determination module 106 may then determine that this C&C domain contacted upon opening and/or executing the "SuspiciousFile.PDF" attachment has been used by the "Red Omen" threat group.

The term "dynamic characteristic," as used herein in connection with a potentially malicious resource, generally refers to any type or form of behavior, attribute, and/or characteristic exhibited by the potentially malicious resource during execution. Examples of dynamic characteristics of potentially malicious resources include, without limitation, contacting remote C&C domains, communicating with remote servers, downloading additional files via the Internet, malicious run-time behaviors, suspicious activity, variations of one or more of the same, combinations of one or more of the same, or any other dynamic characteristics of potentially malicious resources.

In one example, MCDA techniques may enable identification module 104 to identify complex patterns and/or relationships among certain malware samples authored by the same threat group. For example, identification module 104 may apply MCDA techniques to one or more malware samples identified within potentially malicious email campaign 214. By applying the MCDA techniques in this way, identification module 104 may be able to identify certain code sequences that are common to both the malware samples identified within potentially malicious email campaign 214 and one or more malware samples specified by data clusters 210(1)-(N). Determination module 106 may then determine that these malware samples were all authored by the "Red Omen" threat group.

Returning to FIG. 3, at step 306 one or more of the systems described herein may determine that the known threat group is likely responsible for the potentially malicious email campaign based at least in part on the detection of the incriminating feature. For example, determine module 106 may, as part of computing device 202 and/or security server 206 in FIG. 2, determine that the known threat group is likely responsible for potentially malicious email campaign 214 based at least in part on the detection of the incriminating feature. In other words, determination module 106 may determine that potentially malicious email campaign 214 is likely perpetrated by the known threat group.

The systems described herein may perform step 306 in a variety of ways and/or contexts. In one example, determination module 106 may determine that the known threat group is likely responsible for potentially malicious email campaign 214 since the incriminating feature has been linked to the known threat group. Additionally or alternatively, determination module 106 may determine that the incriminating feature suggests and/or indicates that the known threat group likely perpetrated potentially malicious email campaign 214.

Upon the determination that the known threat group is likely responsible for potentially malicious email campaign 214, attribution module 108 may update and/or modify data cluster 210(1) based at least in part on potentially malicious email campaign 214. In one example, identification module 104 may identify one or more features of potentially malicious email campaign 214 that are not specified by data cluster 210(1). For example, identification module 104 may detect fluent English written in email 216(1). In this example, data cluster 210(1) may not yet specify that the "Red Omen" threat group uses the English language. As a result, attribution module 108 may add the English language to data cluster 210(1).

Returning to FIG. 3, at step 308 one or more of the systems described herein may attribute the potentially malicious email campaign to the known threat group in response to the determination that the known threat group is likely responsible for the potentially malicious email campaign. For example, attribution module 108 may, as part of computing device 202 and/or security server 206 in FIG. 2, attribute potentially malicious email campaign 214 to the known threat group. Attribution module 108 may initiate this attribution in response to the determination that the known threat group is likely responsible for potentially malicious email campaign 214.

The systems described herein may perform step 308 in a variety of ways and/or contexts. In some examples, attribution module 108 may attribute potentially malicious email campaign 214 based at least in part on a label that identifies the known threat group. For example, attribution module 108 may label potentially malicious email campaign 214 as being perpetrated by the "Red Omen" threat group. In this example, the label may effectively link potentially malicious email campaign 214 to the "Red Omen" threat group.

In one example, notification module 112 may notify the targeted organization that the known threat group is likely responsible for potentially malicious email campaign 214. For example, notification module 112 may, as part of computing device 202 and/or server 206 in FIG. 2, notify an Information Technology (IT) specialist at "Big Corporation" that the "Red Omen" threat group is attempting to penetrate, infiltrate, and/or infect "Big Corporation" by way of potentially malicious email campaign 214. By notifying the IT specialist of this attempt, notification module 112 may enable the IT specialist at "Big Corporation" to deploy an effective response in time to mitigate and/or neutralize potentially malicious email campaign 214.

Additionally or alternatively, attribution module 108 may label any malicious executables included in and/or connected to potentially malicious email campaign 214. For example, identification module 104 may identify a malicious executable within email 216(N) included in potentially malicious email campaign 214. Attribution module 108 may then label this malicious executable as being authored and/or distributed by the "Red Omen" threat group. The label may effectively link this malicious executable to the "Red Omen" threat group.

In one example, notification module 112 may notify one or more users and/or organizations whose computing devices have been infected by the malicious executable. For example, notification module 112 may notify an Information Technology (IT) specialist at "Competitor Corporation" that the malicious executable has infected one or more computing devices belonging to "Competitor Corporation." In this example, the notification may indicate that the "Red Omen" threat group authored and/or distributed the malicious executable. By notifying the IT specialist of this infection, notification module 112 may enable the IT specialist at "Competitor Corporation" to deploy an effective response in time to mitigate and/or neutralize any harm caused by the malicious executable.

In some examples, method 300 may include one or more additional steps not illustrated in FIG. 3. In one example, attribution module 108 may link the incriminating feature to the known threat group by adding the incriminating feature to data cluster 210(1). For example, identification module 104 may search and/or crawl the Internet for any evidence of features allegedly connected to the "Red Omen" threat group. While searching and/or crawling the Internet in this way, identification module 104 may identify open-source intelligence resource 212 in FIG. 2 hosted by web server 208 in FIG. 2. In this example, open-source intelligence resource 212 may include evidence suggesting and/or indicating that the "SuspiciousFile.PDF" attachment was authored by the "Red Omen" threat group.

In response to this evidence identified in open-source intelligence resource 212, attribution module 108 may add the "SuspiciousFile.PDF" attachment to data cluster 210(1). By adding the "SuspiciousFile.PDF" attachment to data cluster 210(1), attribution module 108 may effectively link the "SuspiciousFile.PDF" attachment to the "Red Omen" threat group, thereby updating data cluster 210(1) based at least in part on open-source intelligence resource 212.

As explained above in connection with method 300 in FIG. 3, an automated system may attribute potentially malicious email campaigns to known threat groups. In one example, this automated system may detect targeted malware campaigns based at least in part on MCDA techniques and/or dynamic execution of malicious email content. Additionally or alternatively, this automated system may recursively aggregate evidence of malware authorship from targeted malware campaigns and/or open-source intelligence resources and then propagate labels identifying the threat groups responsible for such campaigns to the corresponding malware families. Finally, this automated system may use these propagated labels to automatically attribute new malware campaigns to the responsible threat groups.

Figure 6:
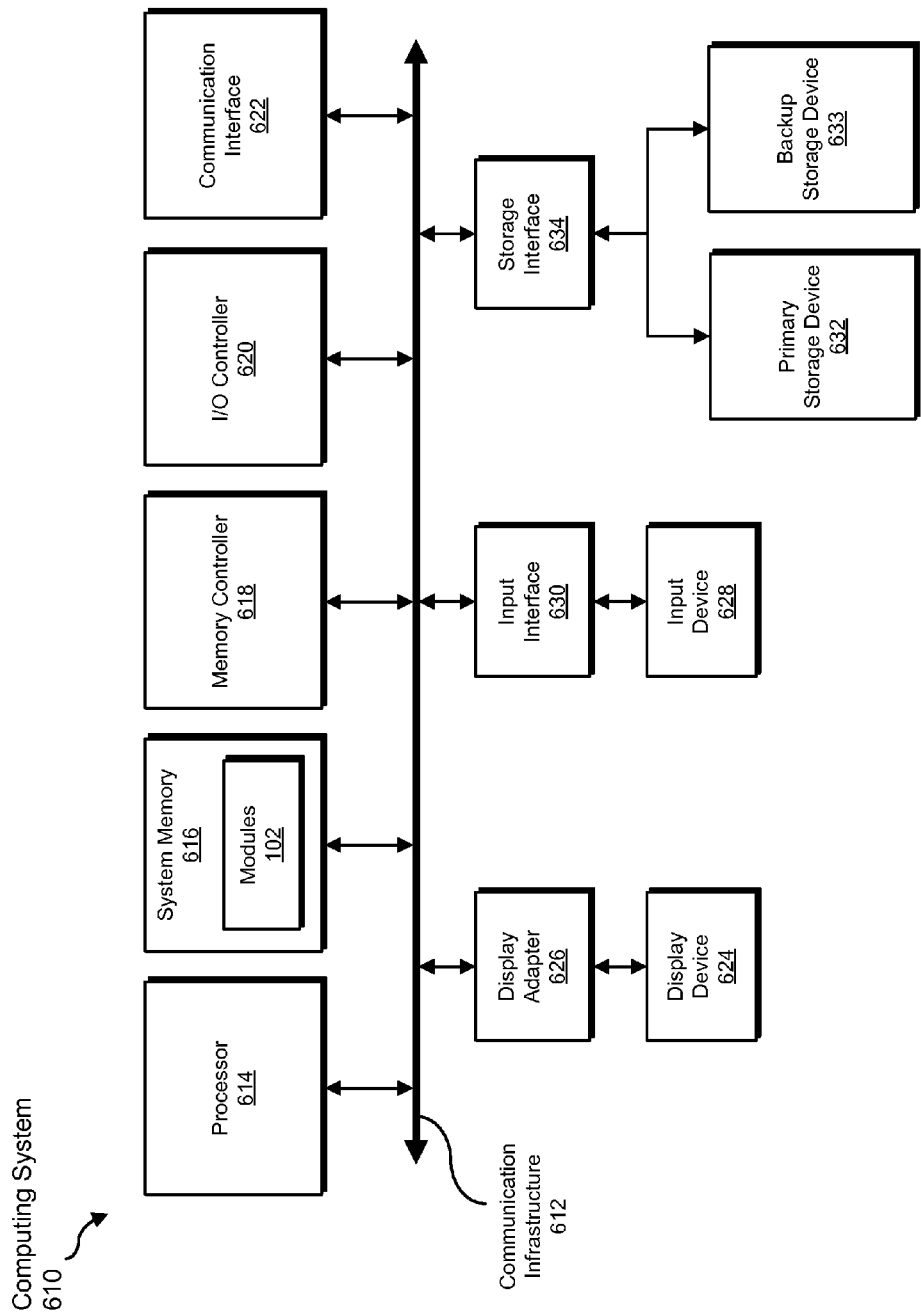
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610.

Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
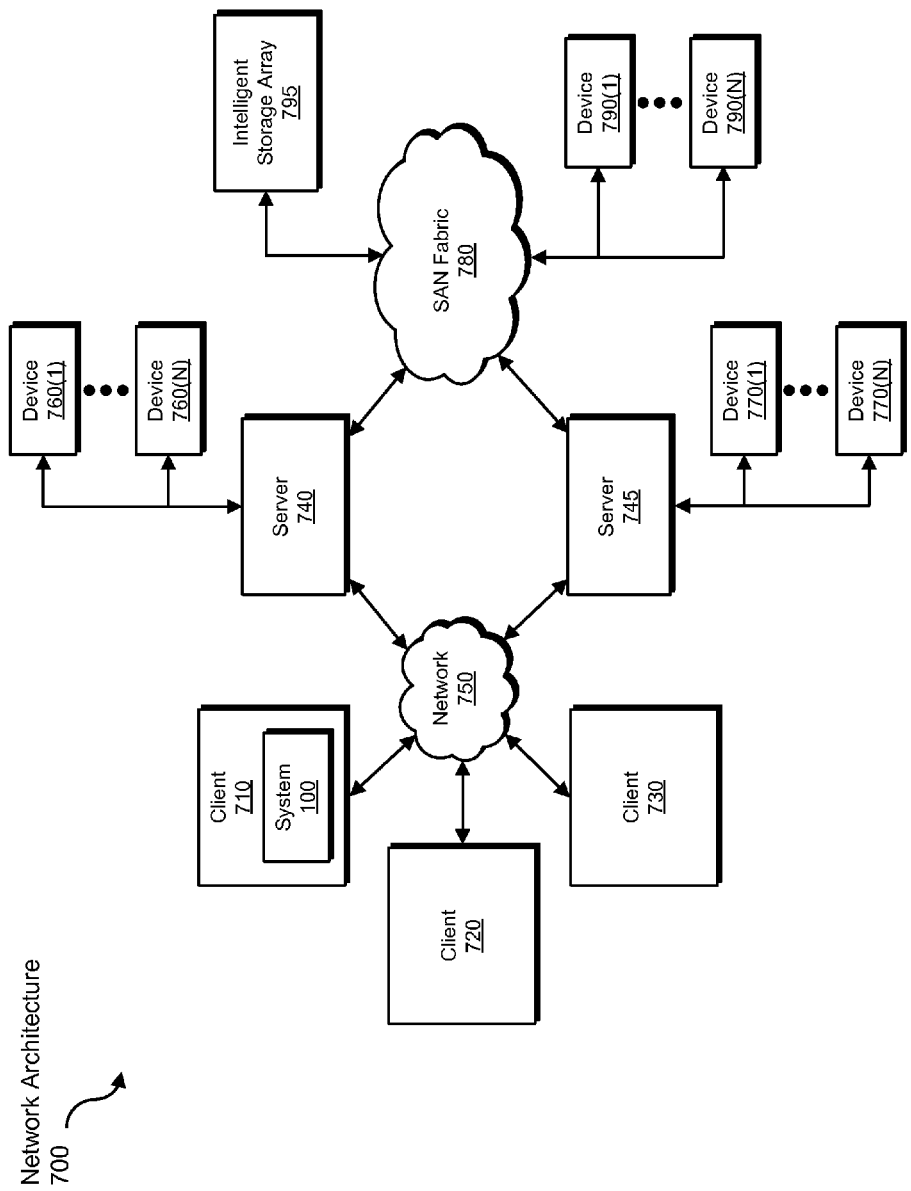
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for attributing potentially malicious email campaigns to known threat groups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to data cluster, use the result of the transformation to determine that a known threat group is likely responsible for a potentially malicious email campaign, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for attributing potentially malicious email campaigns to known threat groups, at least a portion of the method being performed by a computing device comprising at least one processor, the method comprising:

identifying a potentially malicious email campaign targeting at least one organization;

detecting an attachment within at least one email included in the potentially malicious email campaign;

executing the attachment detected within the email included in the potentially malicious email campaign;

determining that, upon execution, the attachment causes a remote download of malicious code;

executing at least a portion of the malicious code whose remote download was caused by the attachment;

observing, while executing the portion of the malicious code, at least one dynamic characteristic of the malicious code, wherein the dynamic characteristic of the malicious code comprises contacting a Command and Control (C&C) domain during execution of the malicious code;

determining that the C&C domain has been linked to a known threat group;

determining, based at least in part on the C&C domain being linked to the known threat group, that the known threat group is likely responsible for the potentially malicious email campaign;

in response to determining that the known threat group is likely responsible for the potentially malicious email campaign, attributing the potentially malicious email campaign to the known threat group.

2. The method of claim 1, wherein determining that the attachment causes the remote download of malicious code comprises:

identifying a data cluster that specifies a plurality of features linked to the known threat group;

identifying the C&C domain within the data cluster.

3. The method of claim 2, further comprising, prior to identifying the C&C domain within the data cluster:

identifying an open-source intelligence resource indicating that the C&C domain is allegedly connected to the known threat group;

linking, based at least in part on the open-source intelligence resource, the C&C domain to the known threat group by adding the C&C domain to the data cluster.

4. The method of claim 1, wherein identifying the potentially malicious email campaign targeting the organization comprises identifying a plurality of emails addressed to the targeted organization.

5. The method of claim 1, wherein determining that the C&C domain has been linked to the known threat group comprises:

identifying at least one static characteristic of the C&C domain;

determining that the static characteristic of the C&C domain is linked to the known threat group.

6. The method of claim 1, wherein determining that the C&C domain has been linked to the known threat group comprises:

identifying at least one additional dynamic characteristic of the C&C domain;

determining that the additional dynamic characteristic of the C&C domain is linked to the known threat group.

7. The method of claim 6, wherein identifying the dynamic characteristic of the C&C domain comprises:

executing at least a portion of the malicious code downloaded from the C&C domain;

observing, while executing the portion of the malicious code, the additional dynamic characteristic of the malicious code.

8. The method of claim 7, wherein the additional dynamic characteristic of the malicious code comprises downloading an additional file via the Internet.

9. The method of claim 1, wherein the attachment comprises at least one of:
- a file;
- a Uniform Resource Locator (URL) to a malicious website.

10. The method of claim 1, further comprising notifying the targeted organization that the known threat group is likely responsible for the potentially malicious email campaign.

11. A system for attributing potentially malicious email campaigns to known threat groups, the system comprising:
- an identification module, stored in memory, that:
  - identifies a potentially malicious email campaign targeting at least one organization;
  - detects an attachment within at least one email included in the potentially malicious email campaign;
- an automation module, stored in memory, that executes the attachment detected within the email included in the potentially malicious email campaign;
- a determination module, stored in memory, that determines that, upon execution, the attachment causes a remote download of malicious code;

wherein:
- the automation module executes at least a portion of the malicious code whose remote download was caused by the attachment;
- the identification module observes, while executing the portion of the malicious code, at least one dynamic characteristic of the malicious code, wherein the dynamic characteristic of the malicious code comprises contacting a Command and Control (C&C) domain during execution of the malicious code;
- the determination module:
  - determines that the C&C domain has been linked to a known threat group;
  - determines, based at least in part on the C&C domain being linked to the known threat group, that the known threat group is likely responsible for the potentially malicious email campaign;
- an attribution module, stored in memory, that attributes the potentially malicious email campaign to the known threat group in response to the determination that the known threat group is likely responsible for the potentially malicious email campaign;
- at least one physical processor that executes the identification module, the automation module, the determination module, and the attribution module.

12. The system of claim 11, wherein the identification module:
- identifies a data cluster that specifies a plurality of features linked to the known threat group;
- identifies the C&C domain within the data cluster.

13. The system of claim 12, wherein:
- the identification module identifies an open-source intelligence resource indicating that the C&C domain is allegedly connected to the known threat group;
- the attribution module links, based at least in part on the open-source intelligence resource, the C&C domain to the known threat group by adding the C&C domain to the data cluster.

14. The system of claim 11, wherein the identification module identifies a plurality of emails addressed to the targeted organization.

15. The system of claim 11, wherein:
- the identification module identifies at least one static characteristic of the C&C domain;
- the determination module determines that the static characteristic of the C&C domain is linked to the known threat group.

16. The system of claim 11, wherein:
- the identification module identifies at least one additional dynamic characteristic of the C&C domain;
- the determination module determines that the additional dynamic characteristic of the C&C domain is linked to the known threat group.

17. The system of claim 16, further comprising an automation module that executes at least a portion of the malicious code downloaded from the C&C domain;
- wherein the identification module observes, during execution of the portion of the malicious code, the additional dynamic characteristic of the malicious code.

18. The system of claim 17, wherein the additional dynamic characteristic of the malicious code comprises downloading an additional file via the Internet.

19. The system of claim 11, wherein the attachment comprises at least one of:
- a file;
- a Uniform Resource Locator (URL) to a malicious website.

20. A non-transitory computer-readable medium comprising one or more computer-executable instructions that, when executed by at least one processor of a computing device, cause the computing device to:
- identify a potentially malicious email campaign targeting at least one organization;
- detect an attachment within at least one email included in the potentially malicious email campaign;
- execute the attachment detected within the email included in the potentially malicious email campaign;
- determine that, upon execution, the attachment causes a remote download of malicious code;
- execute at least a portion of the malicious code whose remote download was caused by the attachment;
- observe, while executing the portion of the malicious code, at least one dynamic characteristic of the malicious code, wherein the dynamic characteristic of the malicious code comprises contacting a Command and Control (C&C) domain during execution of the malicious code;
- determine that the C&C domain has been linked to a known threat group;
- determine, based at least in part on the C&C domain being linked to the known threat group, that the known threat group is likely responsible for the potentially malicious email campaign;
- attribute potentially malicious email campaign to the known threat group in response to the determination that the known threat group is likely responsible for the potentially malicious email campaign.

* * * * *